Patented June 30, 1942

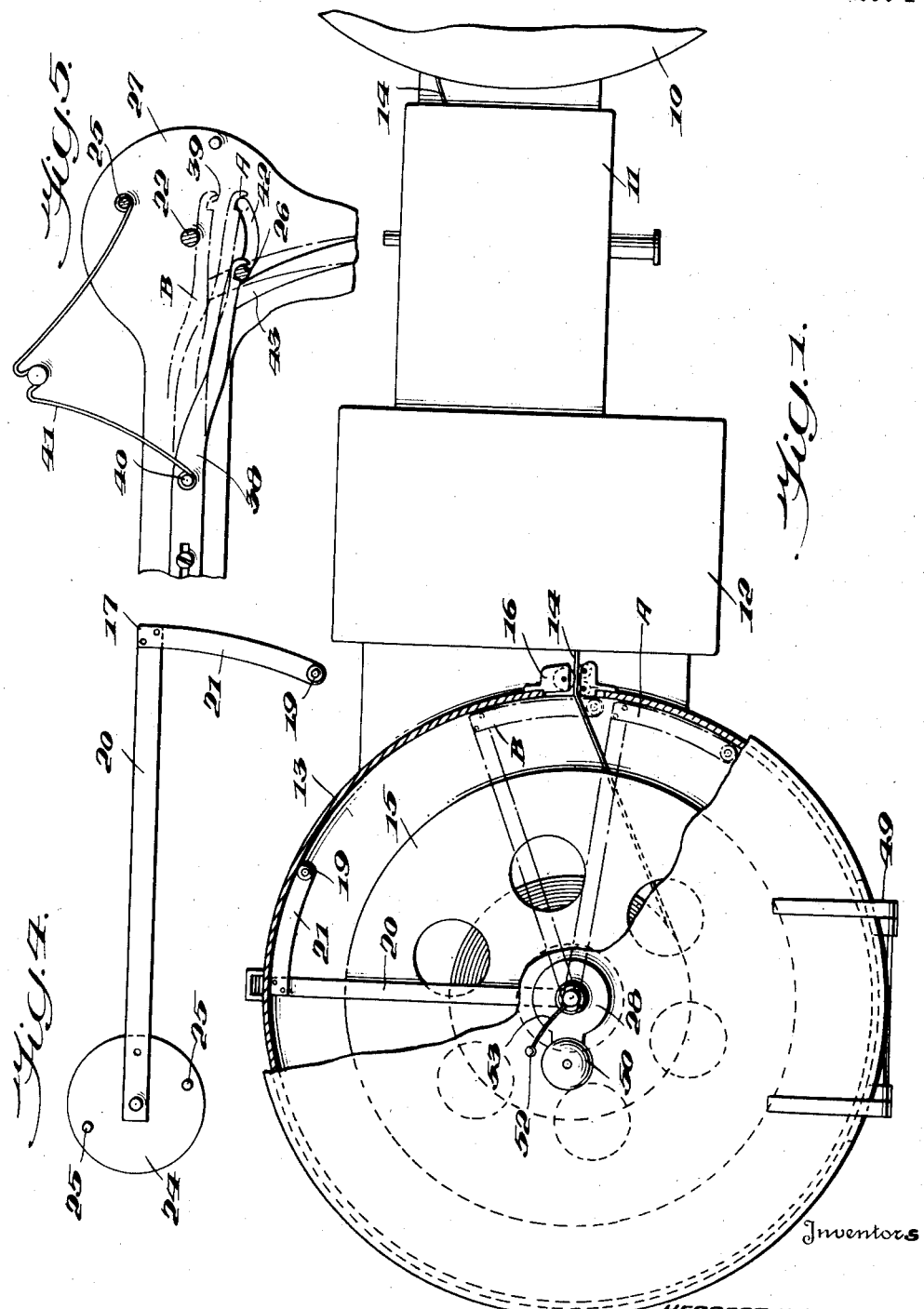

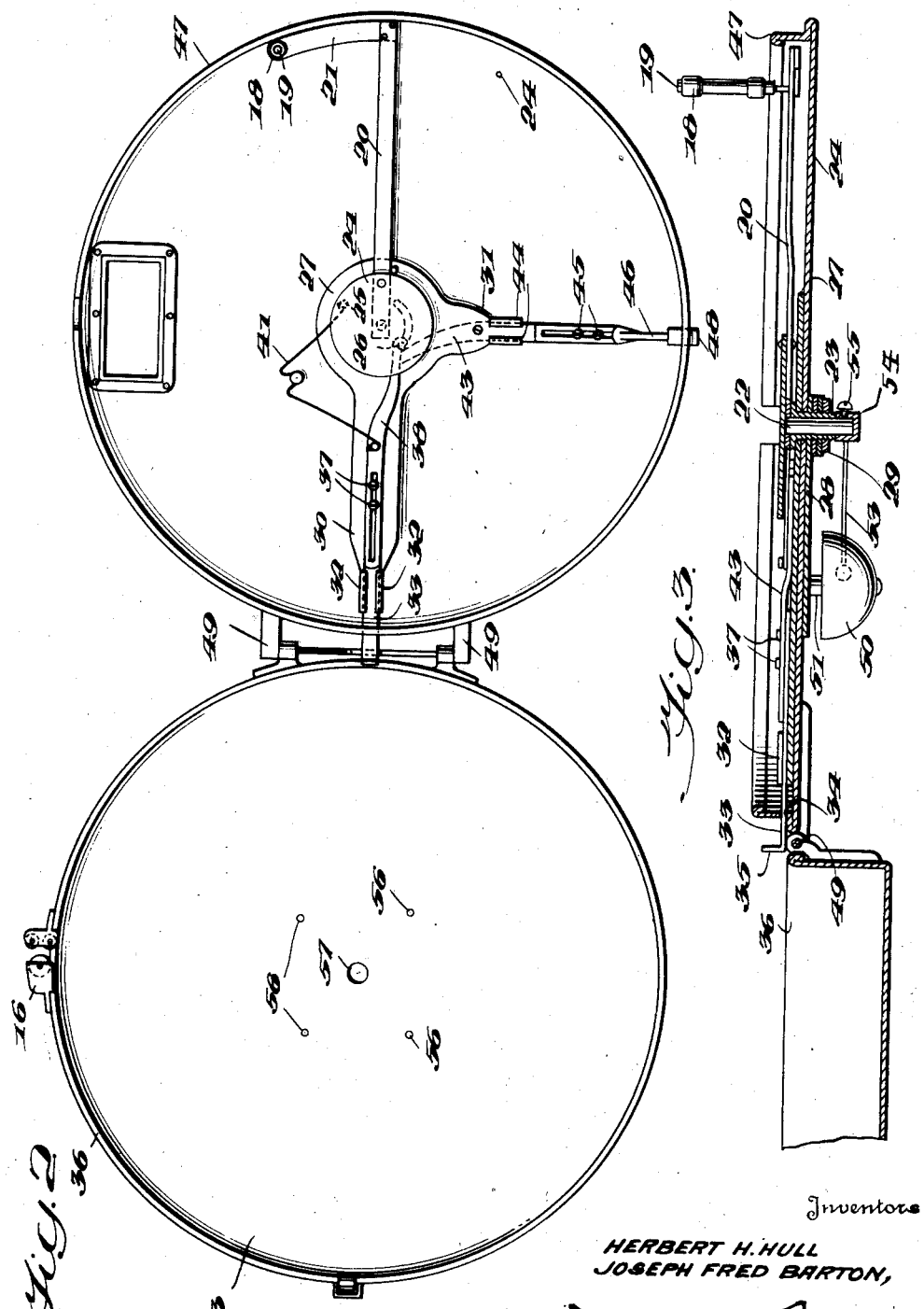

2,288,400

UNITED STATES PATENT OFFICE 2,288,400

SAFETY DEVICE FOR MOTION PICTURE PROJECTORS

Herbert H. Hull and Joseph Fred Barton, Jr., Johnston City, Tenn.

Application October 16, 1940, Serial No. 361,456

21 Claims. (Cl. 116—67)

This invention relates to safety devices for detecting film breakage in motion picture projection apparatus.

The primary object of the invention is to provide a feeler member for engaging the moving film strip, and operating means for the feeler member for automatically setting the same into engagement with the film without requiring additional steps on the part of the machine operator beyond his usual procedure in operating the projecting apparatus.

Another object of the invention is to provide mounting means movably supporting the feeler member so that the latter may be completely removed from the path of the film so as not to interfere with the loading of the machine, and thereafter may be automatically set into engagement with the film in response to further operations of the apparatus inherently preliminary to setting the machine into operation.

A further object of the invention is to provide a feeler member movably mounted on the door of a reel magazine of the projector apparatus for engagement with the film in the magazine.

A still further object of the invention is to provide operating means for the feeler member movably mounted on the magazine door and actuatable by engagement with fixed means upon movement of the door.

Another object of the invention is to provide a movable feeler member carried by a magazine door automatically set into engagement with the film by operating means responsive to the closing of the magazine door.

Still another object of the invention is to provide cam actuated means for setting a feeler member carried by a magazine door to a pre-engagement position responsively to preliminary closing movement of the door, and further cam actuated means for releasing the feeler member from the first cam actuated means for engagement with the film responsive to final closing movement of the door.

Our invention will be more clearly understood by reference to the following detailed description and the accompanying drawings.

In such drawings:

Fig. 1 is a diagrammatic representation of a motion picture projector apparatus showing our invention applied to the take-up reel magazine;

Fig. 2 is a showing of our invention applied to a film reel magazine in another operating position;

Fig. 3 is a sectional view of our invention;

Fig. 4 is a view showing the feeler member of our invention; and

Fig. 5 is a detailed view partly in section showing the feeler member operating means in different positions.

We have shown in Fig. 1 a diagrammatic representation of a motion picture projector including supply magazine 10, projector unit 11, sound head 12 and take-up magazine 13. It will be understood that film 14 passes from supply magazine 10 through the projector apparatus to reel 15, entering the take-up magazine 13 through gate 16.

It is well understood that breakage of the film within the projector apparatus is dangerous in that the film may come into the path of illumination from the projector lamp, and thereby be ignited. In addition to this, the broken end of the film from the supply magazine may become wrapped about a power driven sprocket within the machine so that a considerable footage is wound tightly thereon until the roll of film engages stationary parts of the machine. In case alarm apparatus is provided depending on feeler members engaging the film between the sprocket about which it becomes wrapped and the supply reel, no alarm will be given because the film there remains under tension, and consequently a large amount of film will have to be destroyed to remove it from the sprocket.

In order to detect a breakage of the film anywhere in the projector apparatus, we position our feeler member to engage the film in the take-up magazine, so that a breakage anywhere in the machine will immediately release the feeler member and warn the operator to stop the machine before the film becomes wrapped about any rotating parts therein. In this way film replacement costs will be practically eliminated.

The feeler member includes a film engaging roller 18 journaled on shaft 19 which is connected to radius arm 20 by an offset member 21. Roller 18 is mounted for movement toward the film. For this purpose radius arm 20 is provided with shaft 22. The latter shaft is journaled in bushing 23 attached to door 24 of magazine 13. Radius arm 20 carries plate 24 which carries detents 25 and 26.

Bushing 23, in addition to providing a journal for shaft 22, is used to clamp base member plate 27 to the inside of the door, and plate 28 to the outside of the door. For this purpose, bushing 23 is externally threaded and provided with nut 29.

Base member plate 27 is provided with projections 30 and 31. Projection 30 is provided with guides 32 for retaining operating member 33.

As shown in Fig. 3, member 33 extends through aperture 34 in wall 24 and its outer end is provided with cam surface 35 which coacts with side wall 36 of the magazine upon movement of door 24. Member 33 is connected by screws 37 to member 38. Notch 39 is formed in the end of member 38 for engagement with detent 26 on plate 24. Member 38 is also provided with detent 40.

Spring 41 is interposed between detent 40 on member 38 and detent 25 on plate 24. Spring 41 thereby biases the feeler arm and film engaging roller toward the rest position in which it is shown in Fig. 2. At the same time spring 41 biases member 38 to the position shown in Fig. 2 wherein notch 39 is pressed downwardly to engage detent 26, and cam surface 35 of member 33 is pushed outwardly.

Base plate member 27 is provided with an arcuate aperture 42 in which detent 26 rides, the ends of the slot affording stops to limit the movement of the feeler arm assembly.

It will be understood from Fig. 3 that as door 24 is closed, cam member 35 engages side wall 36 of the magazine and is moved inwardly toward the center of the door. During this movement, notch 39 is in engagement with detent 26 so that the feeler arm assembly is moved against the action of biasing spring 41 to the position A shown in dotted line in Fig. 1. The position A of the feeler arm assembly may be described as the pre-engagement position. It will be understood that the feeler arm assembly under the action of cam 35 will be moved to a position where the film engaging roller 18 is at the right of film 14 when the roller 18 enters magazine 13. This position of member 38 and notch 39 is shown in dotted line at A in Fig. 5.

In order to release the feeler arm assembly from the setting mechanism, member 43 is provided to engage the undersurface of member 38, as best shown in Fig. 5. Member 43 is supported in guides 44 formed on projection 31 of the base plate member 27. Member 43 is attached by screws 45 to member 46, which extends through rim 47 of door 24 and is provided at its outer end with inclined cam surface 48 adapted to engage the side wall 36 of the magazine. This action presses cam 48 inwardly and raises member 38 to disengage notch 39 from detent 26. This position of members 38 and 43 is shown in dotted line at B in Fig. 5. Disengagement of detent 26 from notch 39 releases the feeler arm assembly for movement under biasing spring 41. As shown in Fig. 1, the feeler arm assembly moves to the left and takes up a position limited by the engagement of roller 18 with film 14. This may be described as the engaged position of the feeler member.

It will be understood that cam surface 35 is positioned near hinge 49 mounting door 24 on magazine 13, and that cam surface 48 is positioned at a greater distance from the hinge. Consequently, cam surface 48 does not come into contact with the magazine wall until the final closing movement of the door. By this arrangement roller 18 is not released from pre-engagement position until it is in front of the film, and after engagement with the film it is not moved transversely across the same whereby scratching of the film is avoided.

By mounting our feeler arm assembly on the magazine door, the entire safety mechanism is removed from the neighborhood of the film during the loading of the machine so that it does not interfere with the work of the operator. The operating means for the feeler arm assembly automatically places the feeler arm in correct engagement with the film upon closing of the magazine door. As this is a necessary step precedent to operating the machine, it will be seen that the operator can not avoid setting the safety device, so that it will always be operative when the projection apparatus is in use.

When the feeler arm assembly is in the engagement position shown at B in Fig. 1, it is held against movement by spring 41 through engagement of roller 18 with the moving film 14. In case of film breakage anywhere in the apparatus, roller 18 is released and the entire feeler arm assembly moves under the action of spring 41 to rest position, as shown in full line in Fig. 1. We provide alarm means for warning the operator in case of film breakage. In the embodiment shown this comprises bell means 50 mounted on outer plate 28 by spacer 51. Hammer 52 mounted on resilient member 53 is attached to the outer end of shaft 22 by cap 54 and set screw 55.

Should the film 14 break, the assembly arm is thrown into horizontal position by spring 41 and hammer 52 strikes bell 50 to attract the attention of the operator to the breakage of the film. This permits the operator to stop the machine immediately so that the film will not become wound on the rotating parts of the projection apparatus and thereby prevents destruction of any appreciable amount of film.

It will be understood that in the form shown our invention is easily applicable to existing projector apparatus. These machines utilize a standard size reel, and therefore our feeler arm assembly is made sufficiently large to clear the periphery of the standard reel. Different manufacturers employ reel magazines varying in size, and to accommodate this variation the feeler arm assembly operating members are made so as to be adjustable by screws 37 and 45. In this fashion our safety device may be applied to magazine doors of varying sizes and can be attached thereto easily in the field. If desired, the entire magazine unit such as is shown in Fig. 2 with mounting holes 56 and aperture 57 for receiving the reel spindle may be applied to existing machines.

The safety device of the present invention has herein been explained in connection with the single embodiment thereof illustrated in the drawings, but it will be evident that the principles thereof may be carried out through the employment of parts other than herein disclosed. The scope of the invention is therefore to be determined according to the scope of the appended claims.

We claim:

1. In a motion picture projection apparatus, a compartment adapted to enclose a moving film, a door mounted on the compartment, a feeler arm rotatably mounted on said door, means for biasing the feeler arm to a rest position, said feeler arm being rotatable to engagement position for engagement with the film, operating means for setting the feeler arm from rest position to a pre-engagement position against the action of the biasing means and for releasing the feeler arm for movement by the biasing means from pre-engagement position to engagement position, said operating means being actuated by movement of the door, and alarm means responsive to movement of the feeler arm to rest position under action of the biasing means.

2. In a motion picture projection apparatus, a compartment adapted to enclose a moving film, a door mounted on the compartment, a feeler arm rotatably mounted on said door, means for biasing the feeler arm to a rest position, said feeler arm being rotatable to engagement position for engagement with the film, and means carried by the door operative under movement thereof relative to the compartment to set the feeler arm into biased engagement with the film.

3. In a motion picture projection apparatus, a compartment adapted to enclose a moving film, a door mounted on the compartment, a feeler arm rotatably mounted on said door, means for biasing the feeler arm to a rest position, said feeler arm being rotatable to engagement position for engagement with the film, fixed means on the compartment, and operating means for the feeler arm movably mounted on the door and adapted to coact with the fixed means operative to set the feeler arm to engagement position responsive to closing movement of the door.

4. In a motion picture projection apparatus, a film magazine for receiving a film reel, a door mounted on the magazine, a feeler arm rotatably mounted on the door for movement substantially coaxially with a reel in the magazine, and engageable with a film connected to the reel, and operating means for the feeler arm movably mounted on the door and actuated by movement thereof to set the feeler arm into engagement with the film.

5. In a motion picture projection apparatus, a feeler member adapted for facewise engagement with a moving film, mounting means for the feeler member permitting movement thereof for facewise engagement with the film, carriage means supporting said mounting means operative to move said mounting means and feeler member transversely to the face of the film, operating means for the feeler member carried by the carriage means responsive to movement of the carriage means transversely toward the film to set the feeler member into facewise engagement with the film.

6. In a motion picture projection apparatus, a feeler member adapted for facewise engagement with a moving film, mounting means for the feeler member permitting movement thereof for facewise engagement with the film, carriage means supporting said mounting means operative to move said mounting means and feeler member transversely to the face of the film, operating means for the feeler member carried by the carriage means responsive to movement of the carriage means transversely toward the film to set the feeler member to a pre-engagement position, and means becoming operative after movement of the feeler member into position for facewise engagement with the film under operation of the mounting means to set said feeler member into engagement with the film.

7. A film reel magazine comprising a film gate in the magazine for passage of a moving film, aperture means in the magazine for receiving a reel supporting spindle, a door hinged on the magazine opposite the aperture means, a feeler member movably mounted on the door engageable with a film between the film gate and a reel in the magazine, biasing means biasing the feeler member to rest position, fixed means on the magazine, operating means for the feeler member carried by the door coacting with the fixed means and operative responsive to closing movement of the door to move the feeler member against the action of the biasing means into biased engagement with a film between the film gate and a reel in the magazine.

8. A film reel magazine comprising a film gate in the magazine for passage of a moving film, aperture means in the magazine for receiving a reel supporting spindle, a door hinged on the magazine opposite the aperture means, a feeler arm mounted on the door for movement substantially coaxial with a reel in the magazine and adapted to engage a film between the film gate and a reel in the magazine, biasing means biasing the feeler arm to a rest position, operating means for the feeler arm responsive to closing movement of the door to move the arm to a pre-engagement position, and becoming operative on further closing movement to release the arm for movement to engagement position by the biasing means.

9. A film reel magazine comprising a film gate in the magazine for passage of a moving film, aperture means in the magazine for receiving a reel supporting spindle, a door hinged on the magazine opposite the aperture means, a feeler member movably mounted on the door engageable with a film between the film gate and a reel in the magazine, biasing means biasing the feeler member to a rest position, first latch means carried by the feeler arm, coacting second latch means for operating the feeler arm, operating means for the second latch means comprising cam means carried by the door coacting with the magazine for moving the feeler arm against the action of the biasing means to a pre-engagement position responsive to preliminary closing movement of the door and control means for the coacting latch means responsive to final closing movement of the door to disengage the latch means and release the feeler member for movement to engagement position by said biasing means.

10. In a film reel magazine having a film gate and a hinged door, a feeler member adapted to engage a film intermediate the film gate and a reel in the magazine being mounted for circumferential movement in the annular space between the periphery of the reel and the periphery of the magazine, means responsive to closing movement of the magazine door for moving the feeler member circumferentially of the magazine from rest position to film engaging position, and signal means responsive to reverse circumferential movement of the feeler member upon breakage of the film from film engaging position towards rest position.

11. In a film reel magazine, aperture means for receiving a reel supporting spindle, a film gate for passage of a moving film connected to a reel mounted on a spindle in the magazine, a feeler arm engageable with a film between the film gate and reel, and mounting means for the feeler arm carried by the magazine operative to journal the feeler arm for movement substantially coaxial with the reel.

12. In a film reel magazine, a film gate in the magazine for passage of a moving film, aperture means in the magazine for receiving a reel supporting spindle, a door hinged on the magazine opposite the aperture means, a feeler member carried by the door engageable with a film between the film gate and a reel mounted on a spindle in the magazine, and mounting means on the door opposite the aperture means journaling the feeler member for movement substantially coaxial with the reel supporting spindle.

13. In a film reel magazine, a film gate in the magazine for passage of a moving film, aperture means in the magazine for receiving a reel supporting spindle, a door forming a part of the magazine, a feeler member engageable with a film between the film gate and a reel mounted on the spindle in the magazine, means mounting the feeler member for circumferential movement in the casing about a point substantially coaxial with the reel supporting spindle, and means actuatable by closing of the door for moving the feeler member to film engaging position.

14. In a film reel magazine, a film gate in the magazine for passage of a moving film, aperture means in the magazine for receiving a reel supporting spindle, a door hinged on the magazine opposite the aperture means, a feeler member mounted on the door for circumferential movement in the magazine from a rest position to film engaging position, means for moving the feeler member from rest position to film engaging position, and signal means responsive to reverse movement of the feeler member from film engaging position toward rest position.

15. In combination, a door for a motion picture projector reel magazine, an arm mounted axially of the door for movement circumferentially of the door and carrying a feeler element at a point adjacent the periphery of the door adapted to engage a film within the reel magazine, actuating means operative through the arm to move the feeler element circumferentially of the door from rest position to film engaging position, and signal operating means responsive to reverse circumferential movement of the feeler member towards its position.

16. In combination, a door for application to a moving film projection apparatus compartment, a feeler arm movably mounted on the door, biasing means for biasing the feeler arm to a rest position, operating means for the feeler arm carried by the door comprising cam means movably mounted on the door operatively connected to the feeler arm for moving said arm against the action of the biasing means, said cam means being positioned to coact with fixed means on movement of the door.

17. In combination, a door for application to a moving film projecting apparatus compartment, a feeler member movably mounted on the door, biasing means for biasing the feeler member to a rest position, operating means for the feeler member carried by the door comprising first cam means movably mounted on the door operatively connectable to the feeler member for moving said member against the action of the biasing means to a pre-engagement position, and further cam means movably mounted on the door operative to release the feeler member from said first cam means to permit movement of the feeler member to a position for engagement with a moving film under action of the biasing means, both said cam means being positioned to coact with fixed means on movement of the door.

18. In combination, a door for application to a moving film projecting apparatus compartment, hinge means on the door for mounting the same, a feeler member movably mounted on the door, biasing means for biasing the feeler member to a rest position, operating means for the feeler member carried by the door comprising first cam means movably mounted on the door adjacent the hinge means and being operatively connectable to the feeler member for moving said member against the action of the biasing means to a pre-engagement position, second cam means movably mounted on the door operative to release the feeler member from said first cam means to permit movement of the feeler member to a position for engagement with a moving film under action of the biasing means, both said cam means being positioned to coact with fixed means on movement of the door, and said second cam means being mounted remotely from the hinge means to become operative on final closing movement of the door.

19. A safety device for a motion picture projection apparatus adapted to be mounted on a reel magazine door comprising base member means attachable to the door, a feeler member movably mounted on the base member means for engagement with a moving film, a cam member movably mounted on said base member means operatively engageable with the feeler member to move the same, and a second cam member on said base member means operable to release said first cam member from operative engagement with the feeler member, both said cam members being positioned to coact with fixed means responsive to movement of the base member means.

20. A safety device for a motion picture projection apparatus adapted to be mounted on a reel magazine door comprising base member means attachable to the door, a feeler member movably mounted on the base member means for engagement with a moving film, spring means connecting the feeler member and the base member means, biasing the feeler member in one direction, first cam means movably mounted on the base member means operatively connectable with the feeler member for rotating said member against the action of the spring means, said cam means being positioned for coaction with fixed means responsive to movement of the base member means, and means for operatively disengaging the feeler member from the cam means.

21. In combination, a door for a motion picture projection apparatus adapted to be mounted thereon to give access to a film within the apparatus, a feeler member carried by the door and being movable with the door when the door is in open position in relation to the apparatus to a position remote from the film to give freedom of access to the film, the feeler member being movably mounted on the door for engagement with the film within the apparatus when the door is in closed position in relation to the apparatus, and operating means for automatically setting the feeler member into engagement with the film when the door is in closed position.

HERBERT H. HULL.
JOSEPH FRED BARTON, Jr.